United States Patent [19]

Abadi et al.

[11] Patent Number: 5,173,939
[45] Date of Patent: Dec. 22, 1992

[54] ACCESS CONTROL SUBSYSTEM AND METHOD FOR DISTRIBUTED COMPUTER SYSTEM USING COMPOUND PRINCIPALS

[75] Inventors: Martin Abadi, Palo Alto; Michael Burrows; Edward P. Wobber, both of Menlo Park, all of Calif.

[73] Assignee: Digital Equipment Corporation, Maynard, Mass.

[21] Appl. No.: 783,361

[22] Filed: Oct. 28, 1991

Related U.S. Application Data

[63] Continuation-in-part of Ser. No. 589,923, Sep. 28, 1990.

[51] Int. Cl.$^5$ ............................................. H04L 9/32
[52] U.S. Cl. .................................. 380/25; 380/4; 380/23; 380/49; 380/50; 340/825.31; 340/825.34
[58] Field of Search ............................. 395/275, 725; 340/825.31, 825.34; 380/4, 23, 25, 30, 49, 50

[56] References Cited

U.S. PATENT DOCUMENTS

| | | | |
|---|---|---|---|
| 3,245,045 | 4/1966 | Randlev | 395/275 |
| 4,100,534 | 7/1978 | Shifflet, Jr. | 340/825.31 |
| 4,218,690 | 8/1980 | Ulch et al. | 340/825.31 |
| 4,532,507 | 7/1985 | Edson et al. | 340/825.31 |
| 4,651,279 | 3/1987 | Suzuki | 340/825.31 X |
| 4,799,258 | 1/1989 | Davies | 380/25 X |

Primary Examiner—Bernarr E. Gregory
Attorney, Agent, or Firm—Flehr, Hohbach, Test, Albritton & Herbert

[57] ABSTRACT

A distributed computer system has a number of computers coupled thereto at distinct nodes and a naming service with a membership table that defines a list of assumptions concerning which principals in the system are stronger than other principals, and which roles adopted by principals are stronger than other roles. Each object in the system has an access control list (ACL) having a list of entries. Each entry is either a simple principal or a compound principal. The set of allowed compound principals is limited to a predefined set of allowed combinations of simple principals, roles, delegations and conjunctions in accordance with a defined hierarchical ordering of the conjunction, delegation and role portions of each compound principal. The assumptions in the membership table reduce the number of entries needed in an ACL by allowing an entry to state only the weakest principals and roles that are to be allowed access. The reference checking process, handled by a reference monitor found at each node of the distributed system, grants an access request if the requestor is stronger than any one of the entries in the access control list for the resource requested. Furthermore, one entry is stronger than another entry if for each of the conjuncts in the latter entry there is a stronger conjunct in the former. Additional rules used by the reference monitor during the reference checking process govern the processes of comparing conjuncts in a requestor principal with the conjuncts in an access control list entry and of using assumptions to compare the relative strengths of principals and roles.

14 Claims, 3 Drawing Sheets

ACCESS CONTROL SUBSYSTEM AND METHOD FOR DISTRIBUTED COMPUTER SYSTEM USING COMPOUND PRINCIPALS

This is a continuation-in-part of U.S. Ser. No. 07/589,923, filed Sep. 28, 1990, entitled Compound Principals in Access Control Lists.

The present invention relates generally to controlling access to computer resources in a distributed computer system, and particularly to apparatus and methods for access control in system that allow principals (entities that can submit requests) to adopt roles and to delegate authority to other principals.

BACKGROUND OF THE INVENTION

Computer security systems are often based on the basic access control model, which provides a foundation of secrecy and integrity security procedures. See, for example, the 1974 article by Butler Lampson, "ACM Operating System Reviews," Vol. 8, No. 1, January 1974, pp. 18-24. The elements of this model are:

Objects, which are resources such as files, devices, or processes.
Request to perform operation on objects.
Sources for requests, which are principals.
A reference monitor that examine each request for access to a specified object and decides whether to grant it.

The reference monitor bases its decision on the object, the principal making the request, the operation in the request, and a rule that says what principals may perform that operation.

To do its work, the reference monitor needs a trustworthy way to know the access control rule and the source of the request. Usually the access control rule is attached to the object; such a rule is called an access control list or ACL. For each operation, it specifies a set of authorized principals, and the reference monitor grants a request if its principal is trusted at least as much as one of the authorized principals for the requested operation.

It should be understood that operation of the reference monitor is separated and distinct from other security issues, such as whether a requestor is who he/she/it claims to be. That type of security is typically provided by using encryption and digital signature techniques, as will be understood by those skilled in the art. The present invention is directed at systems and methods for governing access to ojbects in distributed computer system that allow for "compound principals". The concept of compound principals, while discussed in detail below, is also explained in U.S. Pat. application Ser. No. 07/589,923, filed Sep. 28, 1990, entitled Compound Principals in Access Control Lists, hereby incorporated by reference.

SUMMARY OF THE INVENTION

In summary, the present invention is a security system governing access to objects in a distributed computer system. Each object has an access control list having a list of entries. Each access conrol list entry can represent either a simple principal or a compound principal. The set of allowed compounds principals is limited to a predefined set of allowed combination of simple principals, roles, delegations and conjunctions in accordance with a defined hierarchical ordering of the conjunction, delegation and role portions of each compound principal.

The distributed computing system is provided with a naming service having a secure membership table that contains a list of assumptions. Each assumption specifies either one principal as being stronger than another specified principal, or specifies one role as being stronger than another specified role. These assumptions reduce the number of entries needed in an access control list by allowing an entry to state the weakest principals and roles that are authorized to access an object, with all stronger principals and roles being included by way of the assumptions listed in the membership table.

The reference checking process, typically handled by a reference monitor found at each node of the distributed system, grants an access request if the requestor is stronger than any one of the entries in the access control list for the resource requested. Furthermore, one entry is stronger than another entry if for each of the conjuncts in the latter entry there is a stronger conjunct in the former. Additional rules used by the reference monitor the reference checking process govern the processes of comparing conjuncts in a requestor principal with the conjuncts in an access control list entry and of using assumptions to compare the relative strengths of principals and roles.

The present invention provides a framework for making practical use of compound principals in distributed computer systems.

BRIEF DESCRIPTION OF THE DRAWINGS

Additional objects and features of the invention will be more readily apparent from the following detailed description and appended claim when taken in conjunction with the drawings, in which:

DESCRIPTION OF THE PREFERRED EMBODIMENT

Figure 1:
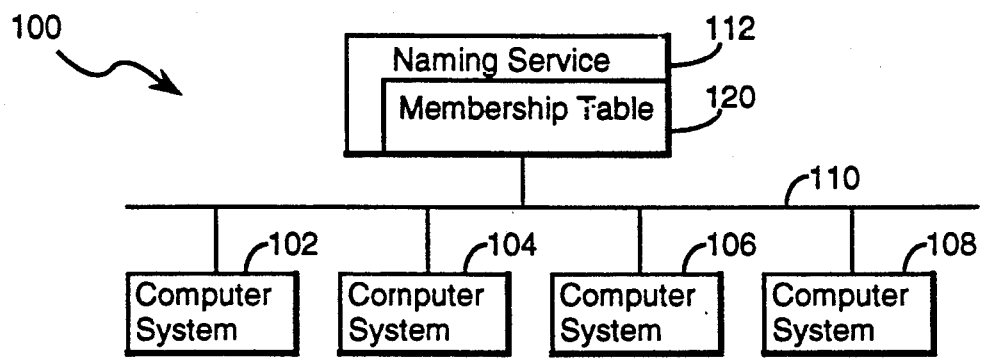
FIG. 1 is a block diagram a distributed computer system with a trusted naming service for storing secure data shared by the members of the system.

Referring to FIG. 1, the present invention is a security system and method which typically operates in the context of a distributed computer system 100 having a set of computers 102-108 interconnected by a local or wide area network 110 or some other communications medium. Each of these computers 102-108 is said to be located at a distinct node of the distributed computer system 100.

For the purpose of this document, we assume that the nodes are connected to each ohter by wires that are not pyhsically secure. In the preferred embodiment, shared key encryption is used to secure channels between the nodes of the distributed system, and these channels are then multiplexed to obtain all the other channels needed by the network. Since the operating system at each node must be trusted anyway, using encryption at a finer grain than this (e.g., between processes) is not necessary. Alternately, public key encryption techniques could be used to secure the channesl between nodes, although public key encryption is usually much slower than shared key encryption.

Each computer 102-108 contains the standard computer system components, including a data processing unit, system bus, random access memory RAM, read only memory (ROM), mass storage (e.g., magnetic or optical disks), a user interface (e.g., keyboard, monitor and printer) and communications ports. These physical computer components (not shown) are not modified by the present invention and are therefore not described in detail herein.

The preferred embodiment of the present invention, shown in FIG. 1, uses a secure "naming service" 112 that is accessible to all the computers 102-108 via the network. The naming service 112 is essentially a simple database management system which maintains a set of data that can be relied upon as being accurate by all the users of the network 112. In the context of the present invention, the naming service 112 contains a "membership table" 120, the meaning of which will be explained in more detail below. The naming service 112 is said to be secure because its contents (and delivery thereof) are protected (typically by encrypting its contents) from modifiaction by unauthorized sources, which allows recipients of data from the naming service 112 to know that they can rely on the information obtained from the naming service.

GLOSSARY

The following are some terms of art which are used below.

Principal. A principal is the the source of a request or assertion. Typically, one thinks of a principal a person, or a machine acting on behalf of a person. However, processes many layers removed from human direction, such as those in a transaction processing system, can also be principals.

Conjunctions. A conjuction is simply two things (here, principals) logically ANDed together. For instance Lampson & Wobber is the conjunction of the principals "Lampson" and "Wobber". Conjunctions are useful in situation that are analogous to requiring two signatures on a check. Requiring two (or more) principals to both sign a request provides greater security, at least in some cases, than requiring only one principal to sign a request.

Delegations. When one principal speaks for another, that is called a delegation. An example would be "Michael for Martin". In certain situations, it is appropriate to give a compound principal formed by a delegation certain access rights, but not others. The present invention provides a mechanism for clearly specifying in an object's access control list (ACL) which such principals with delegations are allowed access and which are not.

Roles. For some access control tasks, it is important to know what role a principal is playing before determining whether that principal should be allowed to access an object. For instance, "Abadi as Employee" may be authorized to access certain information, while "Abadi as Manager" might be. This could be the case because a principal's role might be governed by the process which he is running.

Compound Principals. A compound principal is (A) a principal with one or more assigned roles, (B) a principal which has been delegated to act on behalf of another principal, or (C) the conjunction of any combination of (1) principals, (2) principals with delegations, and (3) principals with assigned roles. Basically, the term "compound" principal is shorthand way of saying any multiple-component principal with is defined in terms of roles, delegation and/or conjunction. The present invention places well defined limits on the acceptable forms of compound principals, as will be described below.

Simple Principals. A simple principal is a single entity, one which is not defined by delegation, roles or conjuction.

Qualified Principal. A qualified principal is a simple principal with one or more assigned roles, such as "P as R1 as R2 ... as Rn", where P is simple principal and R1 to Rn are roles that P may adopt.

Assumptions, Sets of Principals and Sets of Roles. In some cases, it might be convenient to allow everyone in a certain group access to a particular object or set of objects. For example, everyone in the ABC division of a company might need access to the division's production schedule. The distributed computer system might contain hundreds or even thousands of objects related to a particular division (e.g., the maintenance division of an airline, or the data processing staff of a bank). It would be inconvenient to have to change the access control list of numerous objects throughout the distributed computer system every time that an employee quits (or moves to another division) or that a new employee of division ABC joins the company or division. It is much simpler to update one membership list 120 than to update the access control lists of each such object.

These situations are handled by defining a membership table which stores a list of "assumptions". An example of an assumption is "David→ABC_Div", which means that David "speaks for" ABC_Div. Depending on the situation, this means that David has the authority to do whatever ABC_Div has authority to do, or that David is "Stronger than" (or more secure than) ABC_Div.

The same type of logic is also applied to roles. For examples, while everyone in the ABC division may be an Employee, not everyone is a Manager, or President, or Administrator, or Word_Processor, and so on. Some objects might be restricted only to Administrators while others might be accessible to all Employees. These relationships are herein defined by assumptions such as: "Manager→Employee", "President→Manager", "Word_Processor→Employee", and so on.

OBJECTS, ACCESS CONTROL LISTS, REFERENCE MONITOR

Figure 2:
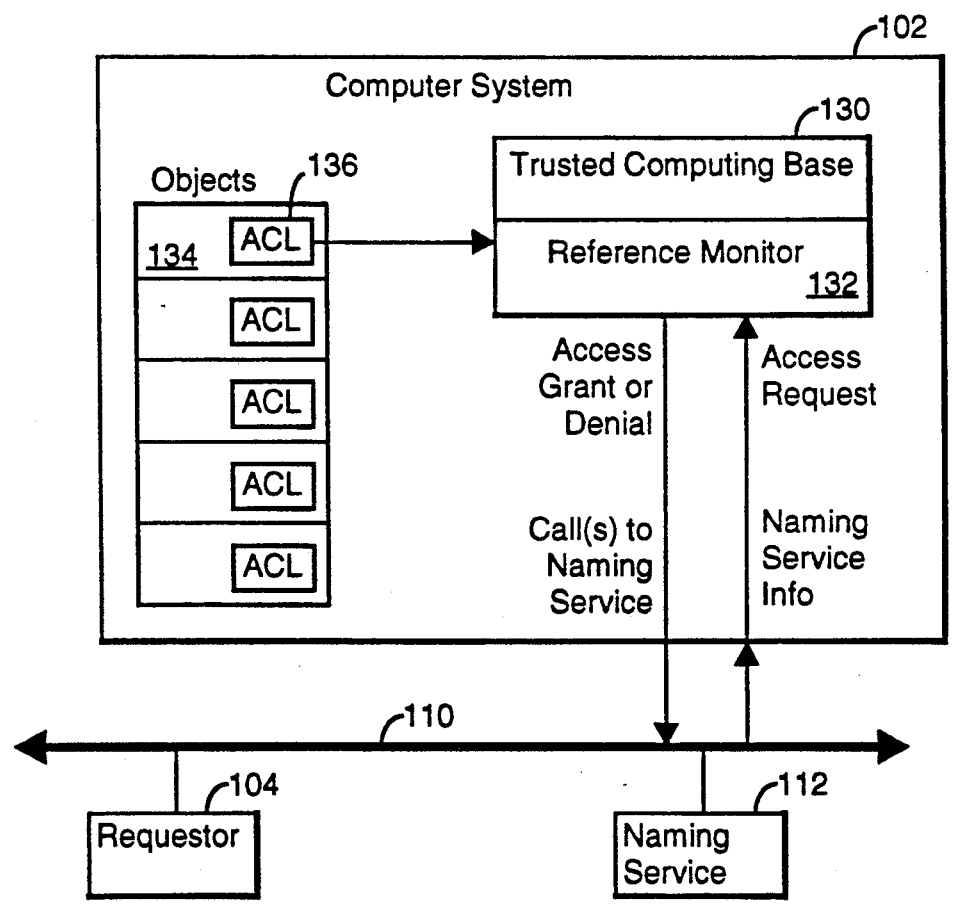
FIG. 2 is a block diagram of one node of the distributed computer system shown in FIG. 1.

Referring to FIG. 2, one node 102 of the distributed system is shown in more detail. Each node must have a trusted computing base 130 or TCB, which is typically a small amount of computer hardware and software that security depends on and that is distinguished from the remainder of the node, which can misbehave without affecting security. The TCB 130 includes a reference monitor program 132 (hereinafter called the reference monitor), which gathers the information needed ot justify and access control decision.

The TCB 130 does not include the sotrage devices from which data is retrieved nor the transmission channels from which messages are received. This is because digitally signed messages can be fetched from unsecured places without any loss of confidence that the signer actually sent it originally. It is important to note that encryption, decryption, digital signatures and the like are not the subject of this document. These topics are widely discussed in the computer security lieterature. The present invention concerns restricting access to requestors comprising "compound principals", and particularly the access control process performed by reference monitor 132, which is described below with reference to FIG. 6.

For the purposes of FIG. 2, one of the nodes 104 has been labelled "requestor" because it is the source of a request to access and object 134 on node 102. However, it should be noted that the requestor is actually a principal using any one of the computers in the distributed system, and can even be pricipal using the same computer as the one at node 102. The requestor sends an access request message to node 102, requesting a specified type of access (e.g., read access, or execution access) to a specified object sorted on node 102. Node 102 will then process the request, and either grant or deny the requestor the specified type access of the specified object.

Objects can be files, processes, set of data such as table or database, programs (e.g., an interface program which governs use of an input/output device), and so on. In the preferred embodiment, the objects 134 governed by the reference monitor 132 on node 102 are stored in the computer at that node (other arrangements may be possible). Each object 134 includes an Access Control List (ACL) 136 which defines the set of "principals" who are authorized to access the object 134.

Figure 3:
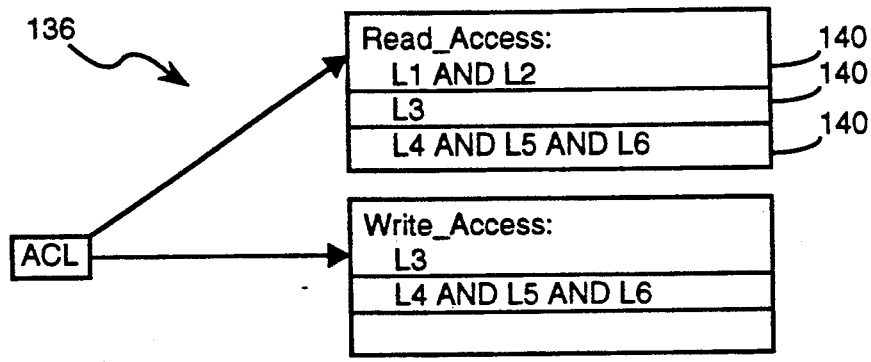
FIG. 3 is a block diagram representing an access control list.

Referring to FIG. 3, the ACL 136 for an object (not shown in FIG. 3) consists of a set of entries 140 for each distinct type of access associated with the object. For instance, if an object is a set of data, it is possible or even likely that some principals might have only read access while other principals are allowed both read and write access. Each entry 140 defines one principal or compound principal who is authorized to access the object.

The concept of compound principals allows for virtually unlimited complexity in defining a requestor or defining a party authorized to access an object. In particular, there is no predetermined prioritization for usage of the qualification ("as"), delegation ("for") and conjunction operators. Thus, it would at least theoretically be possible to have a compound principal such as (P1 and P2) AS ROLE1 or ((P1 AS ROLE1) AND (P2 AS ROLE2)) FOR P3.

Given the virtually unlimited number of such possible compound principals, and given the lack of any requirement for ordering the elements within such compound principals, it would be very difficult or impossible to construct a reliable scheme for comparing principals making requests with the entries in an access control list.

Template for Compound Principals

The present invention solves this problem by (1) imposing a predefined template on compound principals, thereby providing a well defined string of elements that can be reliably parsed and compared with similarly structured strings of elements, and (2) providing a procedure for determining whether a request should be granted.

Figure 4:
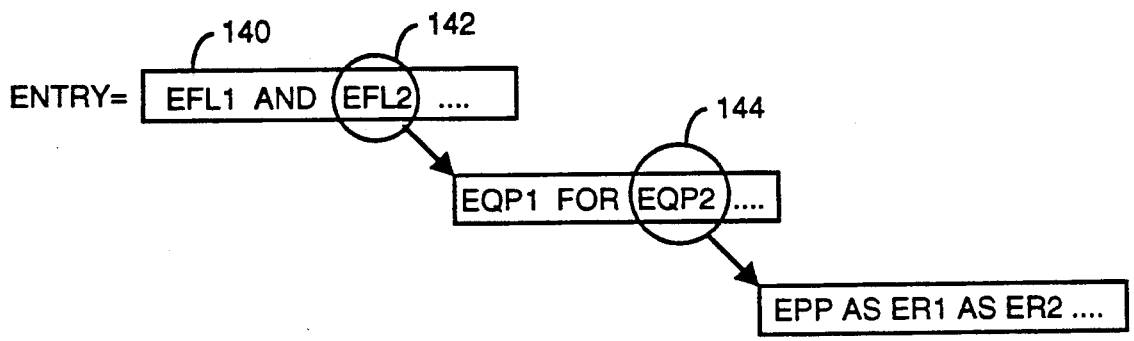
FIG. 4 schematically depicts the elements of one entry in an access control list.

Referring to FIG. 4, each entry 140 in an object's ACL is required to adhere to the following hierarchical format. Request principals must also adhere to this format. Each entry 140 comprises either a single "For-List" EFLi, or the conjunction of two or more For-Lists, such EFL1 AND EFL2 AND EFL3. Each For-List in an ACL entry is also herein called a "conjunct", as in "the first conjunct in the entry 1 is stronger than the second conjunct in entry 2".

A "For-List" is also herein called a "delegated principal".

The simplest way to define a For-List is to first define qualified principals (see above definition in Glossary Section of this document). A qualified principal is a simple principal with a set of zero or more specified roles. Thus, a qualified principal may be a simple principal such as "Abadi" or a more complicated one such as "Abadi as Manager as Auth_Check_Signer". Thus a qualified principal, conceptually, may be a person whose job title's or responsibilities have been listed on his name tag, or it may be a computer running a program (which is then viewed as a role).

Given this definition of a qualified principal, a For-List is a list of zero or more delegations among qualified principals:

| | |
|---|---|
| Qualified Principal (QP) | = Simple Principal (as Role)* |
| For-List | = QP(For QP)* | where ()* indicates zero or more iterations.

Thus a simple For-List is "Abadi as Manager", which contains no delegations. Another For-List is as follows:
Abadi as Manager For Michael as Employee,
where "Abadi as Manager" and "Michael as Employee" are both qualified principals. Another example of a For-List is:
Abadi for Burrows for Michael,
which indicates that Burrows is acting on behalf of Michael, and that Abadi is acting on behalf of "Burrows on behalf of Michael". Thus, conceptually, a For-List is similar to a single person who is acting on behalf of either himself or someone else.

Working our way back up to the top of the hierarchy shown in FIG. 4, an entry is either a single "For-List" EFLi (which is conceptually similar to a single person who is acting on behalf of either himself or someone else), or the conjunction of two or more For-Lists, such EFL1 AND EFL2 AND EFL3 (which is conceptually similar to having a check signed by multiple persons, each of whom may be acting on behalf of someone else).

MEMBERSHIP TABLE

Figure 5:
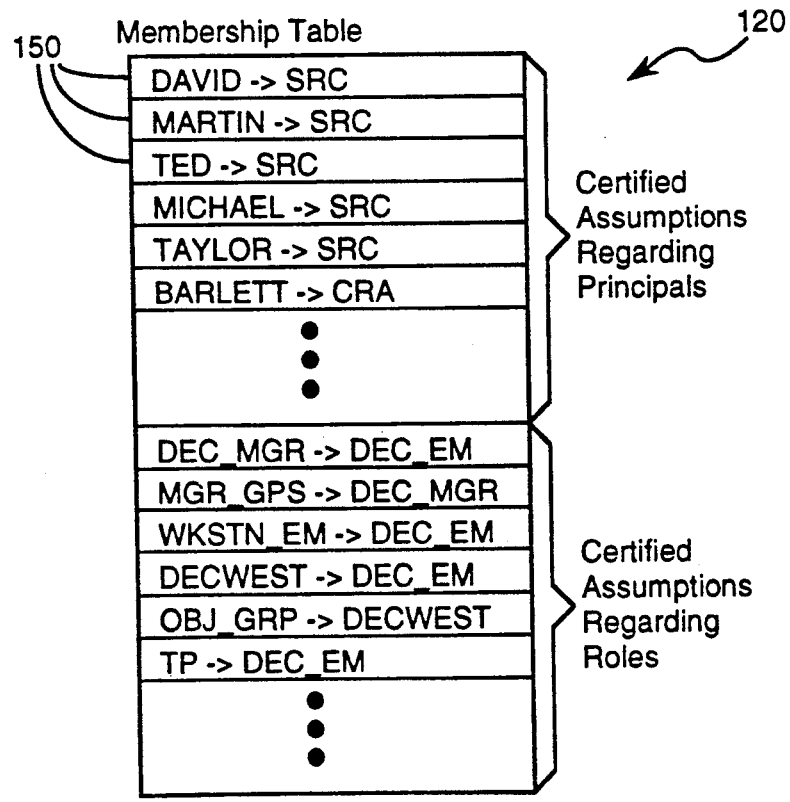
FIG. 5 is a block diagram representing a membership table, which contains a list of assumptions.

Referring to FIG. 5, the membership table 120 provided in the naming service is a table of simple "assumptions". Each assumption 150 is specified in the form of either

| Assumption | Description/Interpretation |
|---|---|
| PA → PB | Simple Principal PA Speaks For or Is Stronger Than Simple Principal PB |
| RA → RB | Role RA Is Stronger Than Role RB |

It is important to note that chaining or combining assumptions listed in the membership list is both allowed and essential. For instance, the assumptions "Manager→Employee" and "President→Manager" when chained lead to the correct conclusion "President→Employee".

The use of assumptions regarding simple principals is a useful construct because in some situations many people may belong to an authorized group of users, in which case all the members of a group can be granted access to an object simply by placing the group name in an entry in the object's ACL, and then including an assumption entry (e.g., "PA→GroupName") for each such person in the group in the membership table 120. Such assumptions are also useful because if one principal is stronger than another principal, the stronger principal should be allowed access to all objects accessible to the weaker principal.

Similarly, some roles are stronger than other roles. Rather than making huge numbers of entries in every object's access control lists to take into account all the possible roles of principals authorized to access the objects, each object need only include an entry or entries containing the "lowest common role" shared by the authorized principals.

The assumptions in the membership table 120 are sometimes called "certified assumptions" because the data in the table is guaranteed to be secure and can be delivered in the form of "certificates" to the reference monitors in the various nodes of the system. For instance, the reference monitor in a node may ask the naming service to certify that "P1 is stronger than P2", with the naming service responding by either providing the certificate if it is true, or denying the request if the assertion is false. Alternately, the reference monitor might request the naming service to provide it with certificate containing a list of data representing all the possible assumptions derived from a principal P1, or from a role R1. In this latter case, the reference monitor would then be responsible for traversing the assumption data.

SPECIAL ADDITIONAL CONSTRUCTS FOR COMPOUND PRINCIPALS

The Iteration Construct ()+can be applied in For-Lists as follows:

Taylor for SRC+ where ()+means one or more iterations, and the above example means "Taylor for SRC" or "(Taylor for SRC) for SRC" and so on. In this example, SRC represents a group of principals, and this construct in an ACL's entry would mean that Taylor acting on behalf of any chain of SRC members is allowed access.

The Alternative Construct "OR" can be applied anywhere in an entry or compound principal, so long as the two items on either side of the OR operator are similar in type. Examples are "Taylor OR Abadi", "Abadi as Manager" OR "Taylor as Director".

A denial or subtraction construct (−) can be applied to simple principals and roles in ACLs, and is given narrow scope in the context of the invention. Consider the situation in which "G2−G" appears in an ACL, with assumptions in the membership list including "A→G, A→G1, G→G2, G1→G2". Should access be granted to A? In the preferred embodiment, "G2−G" means "all members of G, except for those that are members of G2 only via G". Since A has another route through the membership list to G2 other than the route through G (i.e., it gets to G2 by A→G1, G1→G2, without having to use A→G and G→G2), A should be granted access.

An intersection construct ∩ can also be applied to simple principals and roles in ACLs. For instance, an entry in an ACL of the form "SRC ∩ IEEE" could be used to restrict access to SRC employees who are also members of the IEEE group. By way of contrast, an ACL entry of the form "SRC & IEEE" is less restrictive because it can be matched either by a simple requestor principal who is a member of both SRC and the IEEE group, or it can be matched by a compound requestor principal having one simple principal who is a member of SRC and a second simple principal who is a member of the IEEE group.

REFERENCE CHECKING PROCESS

The reference checking process determines whether a request should be granted, as follows:

A request should be granted if the requestor is stronger than one of the entries in the ACL for the resource requested.

A requestor is stronger than an entry in an ACL if for each of the conjuncts in the ACL entry there is a stronger conjunct in the requestor.

A first For-List is stronger than a second For-List if they have the same length (i.e., the same number of qualified principals) and each qualified principal in the first For-List is stronger than the corresponding qualified principal in the second For-List.

A first qualified principal is stronger than a second qualified principal if the set of roles given in the first qualified principal is stronger than that given in the second qualified principal and the simple principal in the first qualified principal is stronger than the simple principal in the second qualified principal.

A first set of roles is stronger than a second set of roles if each role in the first set is stronger than some role in the second set.

A first simple principal is stronger than a second simple principal if (A) they are identical, (B) there is an assumption in the membership table stating that the first simple principal is stronger than the second simple principal, or (C) there is a third simple principal intermediate in strength between the first and the second, according to the assumptions in the membership table.

A first role is stronger than a second role if (A) they are identical, (B) there is an assumption in the membership table stating that the first role is stronger than the second role, or (C) there is a third role intermediate in strength between the first and the second roles, according to the assumptions in the membership table.

Figure 6:
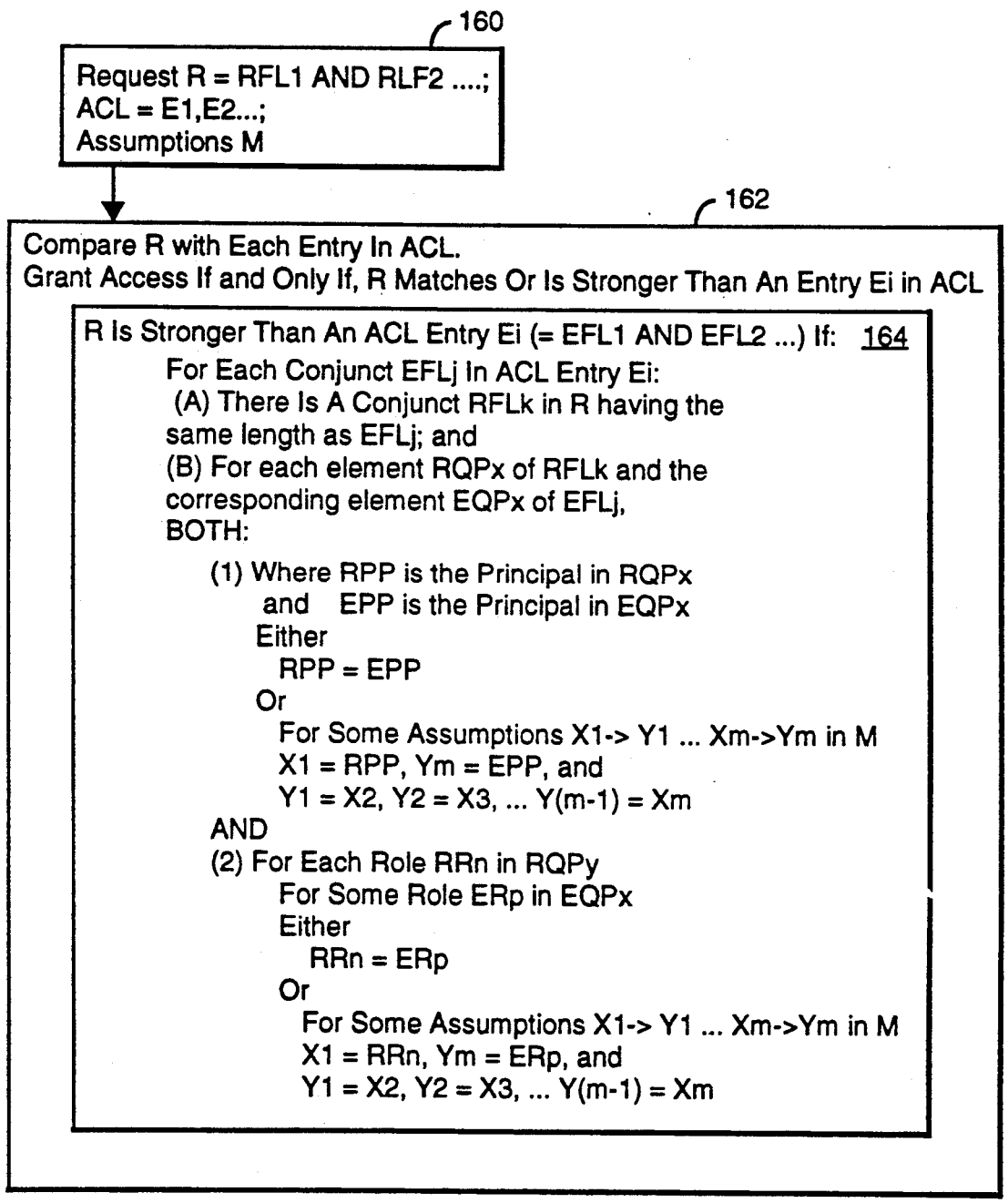
FIG. 6 is a flow chart of the process performed by a node's reference monitor to determine whether or not to grant a request for access to a specified object.

FIG. 6 contains a "pseudocode" program representation of the request determination procedure performed by the reference monitor (see FIG. 2). At shown in step 160 of FIG. 6, the request R to be tested, in general, can the form of any legal ACL entry, and thus is defined as

R=RFL1 AND RFL2..., where RFL1 and RFL2 are For-Lists. Of course, the request may be a simple principal, but it also may be a compound principal of any form which complies with the above described template for ACL entries. Requests cannot include the iteration construct, the alternative construct, the denial construct, nor the intersection construct, all of which constructs are used only in the entries of an object's ACL.

The request R is compared with each entry in a specified object's Access Control List (ACL), and is granted access if and only if the requestor matches or is stronger than an entry in the ACL (step 162). The pseudocode of step 164 represents a detailed specification for determining whether a request R is stronger than an entry.

At the highest level, the request R can be compared with a particular entry in the ACL only if for each conjunct (i.e., For-List) EFLj in the ACL entry there is a conjunct of equal length in the request R. Only For-Lists of the same length can be compared. If this requirement is not met, the process moves onto the next entry in the ACL.

If the equal length requirement for conjuncts is met, then the qualified principal elements RQPy of the request R's conjunct are compared with the qualified principal elements EQPx of the ACL entry. In particular, for each qualified principal EQPx in the ACL entry's For-List, the corresponding qualified principal RQPx in request R which (1) has a principal RPP at least as strong as the principal EPP of EQPx and also (2) every role RRn in the qualified principal RQPx must be at least as strong as some role ERp of EQPx. Note that the first qualified principal in the request R is compared with the first qualified principal in the entry, the second with the second, and so on. The phrases "Stronger Than" and "At Least As Strong As" are synonymous, and such relationships are determined using the membership table and the rules explained above.

It should be understood that any conjuncts of proper length can be compared against any conjunct in the ACL entry, and that therefore more than one conjunct of request R may have to be tested if the first one is not stronger than the ACL entry's conjunct. This comparison process continues until either an ACL entry is found for which the request R is stronger, in which case access is granted, or until all the ACL entries have been tested without success, in which case access is denied.

The inventors believe that the above described limitations on the allowed forms for compound principals provide sufficient flexibility to accommodate virtually all compound relationships needed for access control. Furthermore, this set of limitations allows a systematic comparison of a request R with an object's access control list which can be proven analytically to be complete.

ALTERNATE EMBODIMENTS

The advantage of have a single secure naming service 112 that is shared by all the system's nodes, as shown in FIG. 1, is that the security manager in charge of maintaining the membership table 120 needs to store only one copy of the table, which is then available for every one to use. The disadvantage is that it is difficult to design a secure naming service. A second embodiment of the membership table 120 is simply to include a copy of the table in every computer system which is a member of a "trust realm" (i.e., a collection of computer systems which share a common security policy, and trust one another to maintain that policy). This has the obvious disadvantage of requiring that updates to the table be copied into all these computer systems in a way that is safe and secure. However, this second embodiment has the advantage of being relatively easy to implement.

A potential extension of the ACL entry construct defined above is to allow the use of variables in place of any simple principal or role, while allowing constraints to be added to the ACL entry. For example, one could have an entry "X and Y, such that X≠Y and X→GP1 and Y→GP1". This entry would require that two distinct members of group GP1 request access together, without any limitation on who those two members were. This provides more security than an entry which reads "GP1 and GP1", because that entry will be satisfied by any single member of group GP1. To accommodate variables and constraints, the reference monitor's access checking algorithm would need to be modified to add constraint checks and backtracking.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A distributed computer system, comprising:
   a multiplicity of interconnected computers; wherein principals working on said multiplicity of computers include simple principals and compound principals, each compound principal being selected from the set consisting essentially of: (A) qualified principals, each qualified principle comprising any one of said simple principals whose object access authority is qualified by at least one role adopted by that simple principal; (B) any first one of said principals whose object access authority is qualified by delegation of said first principal's object access authority to any designated second one of said principals; and (C) conjunctions of said simple, qualified and compound principals; and
   object access control apparatus, said object access control apparatus comprising:
   membership means for storing a list of assumptions, said list of assumptions including (A) a first set of assumptions, each assumption in said first set defining relative strengths of at least two specified ones of said principals for purposes of object access authority, and (B) a second set of assumptions, each assumption in said second set defining relative strengths of roles that can be adopted by ones of said principals for purposes of qualifying object access authority of said principals;
   a multiplicity of objects, each stored in one of said multiplicity of interconnected computers and having an associated access control list; each object's access control list having a list of entries, wherein each entry represents one of said simple principals or compound principals that are authorized to access said object; and
   a plurality of reference monitors, each in a trusted computing base within a different one of said multiplicity of interconnected computers, wherein each reference monitor receives access requests transmitted by ones of said principals working on any of the computers in said distributed computer system, each access request specifying one of said multiplicity of objects for which access is requested and a request principal, said request principal comprising the principal that transmitted said access request;
   each reference monitor including access checking means for (A) comparing said request principal with each entry in the list of entries in said specified object's access control list, (B) retrieving from said membership means information concerning relative strengths of said request principal and the principal represented by each said entry and relative strengths of roles adopted by said request principal and roles adopted by the principal represented by each said entry, and (C) granting access to said specified object by said request principal only if said request principal is at least as strong as at least one of said entries in the list of entries in said specified object's access control list.

2. The object access control apparatus of claim 1, wherein
said principal represented by each entry in the list of entries in each object's access control list is selected from the set consisting essentially of (1) said simple principals, (2) said qualified principals, (3) For-Lists, each denoting at least one simple or qualified principal which has delegated authority to another denoted simple or qualified principal, and (4) conjunctions of at least two principals selected from the set consisting of simple principals, qualified principals and For-Lists.

3. The object access control apparatus of claim 2, wherein
said request principal is selected from the set consisting essentially of (1) said simple principals, (2) said qualified principals, (3) For-Lists, each denoting at least one simple or qualified principal which has delegated authority to another denoted simple or qualified principal, and (4) conjunctions of at least two principals selected from the set consisting of simple principals, qualified principals and For-Lists.

4. The object access control apparatus of claim 3, wherein
each For-List's length is defined as the number of simple principals and qualified principals in said For-List; and
said access check means, when comparing the request principal specified in one of said access requests with an entry in the list of entries in said specified object's access control list, compares any For-List in said request principal only with the For-Lists, if any, in said entry of equal length and compares each qualified principal in said request principal only with the qualified principals, if any, in said entry.

5. The object access control apparatus of claim 4, wherein
any first qualified principal in said request principal is at least as strong as any second qualified principal in said entry only when (A) said first qualified principal's simple principal is at least as strong as said second qualified principal's simple principal, in accordance with said assumptions in said membership table, and (B) each role in said first qualified principal is at least as strong as some role in said second qualified principal, in accordance with said assumptions in said membership table.

6. The object access control apparatus of claim 5, wherein
any first For-List in said request principal is at least as strong as any second For-List in said entry only when each qualified principal and/or simple principal in the first For-List is stronger than a corresponding qualified principal and/or simple principal in the second For-List.

7. The object access control apparatus of claim 3, wherein
any first qualified principal in said request principal is at least as strong as any second qualified principal in said entry only when (A) said first qualified principal's simple principal is at least as strong as said second qualified principal's simple principal, in accordance with said assumptions in said membership table, and (B) each role in said first qualified principal is at least as strong as some role in said second qualified principal, in accordance with said assumptions in said membership table.

8. A method of controlling access to objects in a distributed computer system having a multiplicity of interconnected computers, wherein principals working on said multiplicity of computers include simple principals and compound principals, each compound principal being selected from the set consisting essentially of: (A) qualified principals, each qualified principle comprising any one of said simple principals whose object access authority is qualified by at least one role adopted by that simple principal; (B) any first one of said principals whose object access authority is qualified by delegation of said first principal's object access authority to any designated second one of said principals; and (C) conjunctions of said simple, qualified and compound principals;
the method comprising the steps of:
storing a list of assumptions, said list of assumptions including (A) a first set of assumptions, each assumption in said first set defining relative strengths of at least two specified ones of said principals for purposes of object access authority, and (B) a second set of assumptions, each assumption in said second set defining relative strengths of roles that can be adopted by ones of said principals for purposes of qualifying object access authority of said principals;
storing a multiplicity of objects in ones of said multiplicity of interconnected computers and storing an access control list for each object; each object's access control list having a list of entries, wherein each entry represents one of said simple principals or compound principals that are authorized to access said object; and
at a plurality of said computers, (A) receiving access requests transmitted by ones of said principals working on any of the computers in said distributed computer system, each access request specifying one of said multiplicity of objects for which access is requested and a request principal, said request principal comprising the principal that transmitted said access request, (B) comparing said request principal with each entry in the list of entries in said specified object's access control list, (C) retrieving from said membership means information concerning relative strengths of said request principal and the principal represented by each said entry and relative strengths of roles adopted by said request principal and roles adopted by the principal represented by each said entry, and (D) granting access to said specified object by said request principal only if said request principal is at least as strong as at least one of said entries in the list of entries in said specified object's access control list.

9. The method of claim 8, wherein
said principal represented by each entry in the list of entries in each object's access control list is selected from the set consisting essentially of (1) said simple principals, (2) said qualified principals, (3) For-Lists, each denoting at least one simple or qualified principal which has delegated authority to another denoted simple or qualified principal, and (4) conjunctions of at least two principals selected from the set consisting of simple principals, qualified principals and For-Lists.

10. The method of claim 9, wherein said request principal is selected from the set consisting essentially of (1) said simple principals, (2) said qualified principals, (3) For-Lists, each denoting at least one simple or qualified principal which has delegated authority to another denoted simple or qualified principal, and (4) conjunctions of at least two principals selected from the set consisting of simple principals, qualified principals and For-Lists.

11. The method of claim 10, wherein each For-List's length is defined as the number of simple principals and qualified principals in said For-List; and said comparing step including comparing any For-List in said request principal only with the For-Lists, if any, in said entry of equal length and comparing each qualified principal in said request principal only with the qualified principals, if any, in said entry.

12. The method of claim 11, wherein any first qualified principal in said request principal is at least as strong as any second qualified principal in said entry only when (A) said first qualified principal's simple principal is at least as strong as said second qualified principal's simple principal, in accordance with said assumptions in said membership table, and (B) each role in said first qualified principal is at least as strong as some role in said second qualified principal, in accordance with said assumptions in said membership table.

13. The method of claim 12, wherein any first For-List in said request principal is at least as strong as any second For-List in said entry only when each qualified principal and/or simple principal in the first For-List is stronger than a corresponding qualified principal and/or simple principal in the second For-List.

14. The method of claim 10, wherein any first qualified principal in said request principal is at least as strong as any second qualified principal in said entry only when (A) said first qualified principal's simple principal is at least as strong as said second qualified principal's simple principal, in accordance with said assumptions in said membership table, and (B) each role in said first qualified principal is at least as strong as some role in said second qualified principal, in accordance with said assumptions in said membership table.

* * * * *